United States Patent [19]

Horiuchi et al.

[11] 4,087,727

[45] May 2, 1978

[54] REGENERATIVE BRAKE CONTROL SYSTEM FOR DC MOTOR

[75] Inventors: Michimasa Horiuchi, Mito; Hiroshi Narita, Katsuta, both of Japan

[73] Assignee: Hitachi, Ltd., Japan

[21] Appl. No.: 745,998

[22] Filed: Nov. 30, 1976

[30] Foreign Application Priority Data

Dec. 17, 1975 Japan .................................. 50-149519

[51] Int. Cl.² ............................................. H02P 3/14
[52] U.S. Cl. ............................................................ 318/376
[58] Field of Search ............... 318/366, 368, 376, 379, 318/380

[56] References Cited

U.S. PATENT DOCUMENTS

| | | | |
|---|---|---|---|
| 3,800,202 | 3/1974 | Oswald | 318/368 X |
| 3,947,740 | 3/1976 | Tsuboi | 318/376 |
| 3,983,465 | 9/1976 | Tsuboi et al. | 318/376 |
| 4,051,421 | 9/1977 | Brinner et al. | 318/376 X |

Primary Examiner—Robert K. Schaefer
Assistant Examiner—W. E. Duncanson, Jr.
Attorney, Agent, or Firm—Craig & Antonelli

[57] ABSTRACT

Regenerative brake control system for DC motor, in which a resistor is inserted in the motor circuit to effect regenerative brake control from a high speed by use of a chopper. In the voltage control region where the motor voltage less the voltage drop across the inserted resistor is controlled below an equivalent source voltage, the inserted resistor is not short-circuited, thus improving the efficiency of the regenerative brake.

7 Claims, 9 Drawing Figures

F I G. 7
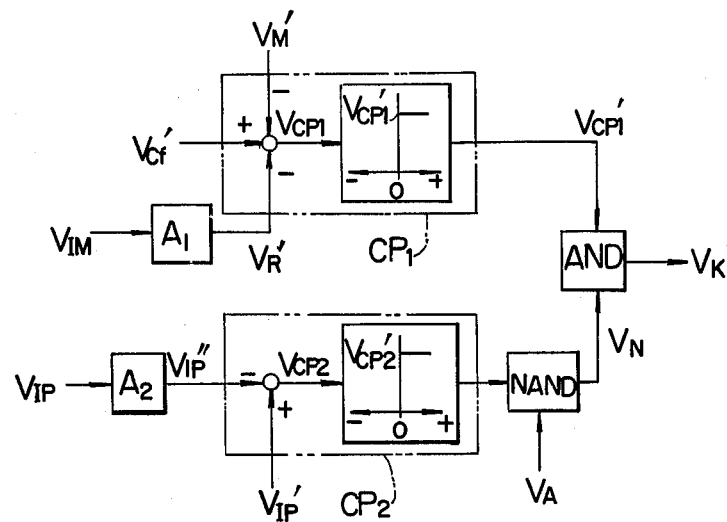
F I G. 8
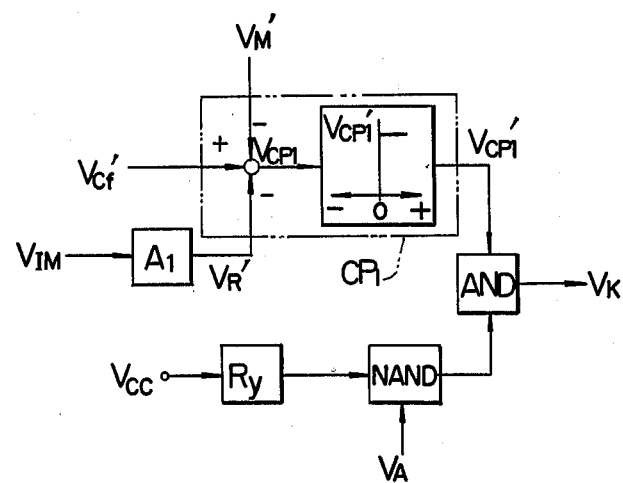

REGENERATIVE BRAKE CONTROL SYSTEM FOR DC MOTOR

This invention relates to a motor control apparatus, or more in particular to an improvement in the motor control apparatus for effecting regenerative brake control by means of a chopper with a resistor inserted in series with the motor.

DESCRIPTION OF THE PRIOR ART

In regenerative brake control of a DC series motor with a chopper, the motor operates as a generator, and therefore the motor voltage cannot be increased beyond a source voltage, thus posing a problem of shortage of braking power in high speeds. In order to solve this problem, a regenerative brake system is known in which a resistor is connected in series with the DC motor to utilize dynamic braking at the same time, as disclosed in "Conference Record IEEE International Semiconductor Power Converter Conference" in Lord Baltimore Hotel, Baltimore, Md., U.S.A. May 8 to 10, 1972, on Page 3-7-3 and FIG. 4, and U.S. Pat. No. 3,947,740 issued May 30, 1976. This resistor is operatively inserted in high speed regions where the motor voltage is higher than an equivalent source voltage so that the motor voltage less the voltage drop across the resistor is controlled not higher than the equivalent source voltage. Such control regions are referred to as a voltage control region hereinafter. By suitable determining the value of the inserted resistor, therefore, the desired regenerative braking is obtainable even in high speed regions. When the motor is reduced in speed and the motor voltage drops below the equivalent source voltage, on the other hand, the resistor is short-circulated.

In a circuit (which will be described later with reference to FIG. 3) where a signal for short-circuiting the resistor in response to the detection in which the motor is reduced in speed to such an extent that the motor voltage drops below the equivalent source voltage, however, it has been found that the signal for short-circuiting the inserted resistor may be generated even within the voltage control region. The short-circuiting of the resistor within the voltage control region causes the shortage of regenerative braking power on the one hand and a reduced regenerative power on the other.

An object of the present invention is to overcome the above-mentioned disadvantages and to provide a regenerative brake control system for DC motor due to a chopper, which has superior regenerative braking characteristics by short-circuiting the resistor inserted in series with the motor, at appropriate timing.

Another object of the invention is to provide, in a regenerative brake control for DC motor due to a chopper having a resistor in series with the motor, a regenerative brake control system in which the inserted resistor is not short-circuited in the voltage control region where the motor voltage less the voltage drop across the resistor is controlled below an equivalent source voltage.

According to one aspect of the invention, there is provided a regenerative brake control system for a DC motor, comprising: the DC motor; resistor means connected in series with the DC motor; switch means for short-circuiting the resistor means; chopper means connected in parallel to the series circuit including the DC motor and the resistor means, for controlling the armature current of the DC motor by ON-OFF operation; means for controlling a duty cycle of the chopper means; a filter circuit being connected through a diode to the parallel circuit including the chopper circuit and the series circuit; and a power supply connected to the filter circuit; the short-circuiting switch means prohibited from operating within a predetermined value of the difference between the equivalent source voltage taking the minimum duty cycle of the chopper into consideration and the motor voltage less the voltage drop across the resistors.

FIGS. 7, 8 and 9 are circuit diagrams showing second, third and fourth embodiments of the invention.

Figure 1:
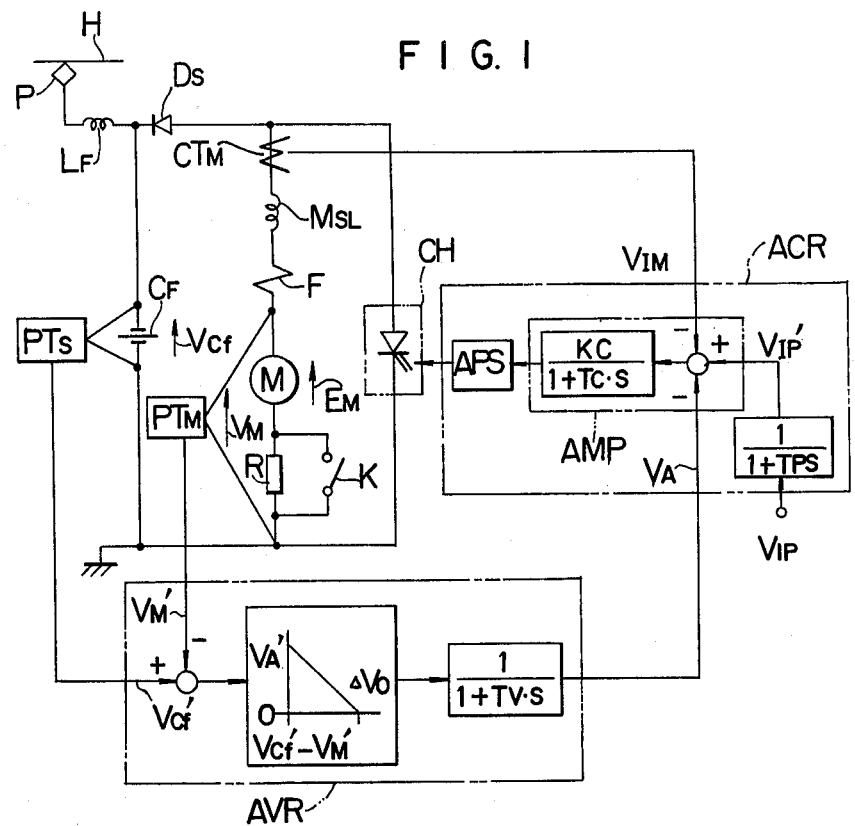
FIG. 1 is a schematic diagram showing a motor control apparatus for effecting regenerative brake control by means of a chopper with a resistor inserted in series with the motor.

A circuit example for effecting regenerative braking operation with a chopper through a resistor inserted in series with a series motor for driving an electric car to control the same is shown in FIG. 1. In this drawing, reference symbols $L_F$, $C_F$ show a filter reactor and a filter capacitor respectively for smoothing a source current, symbol MSL a smoothing reactor for reducing a pulsating current in the motor current $I_M$, symbol F the field winding of a DC motor, symbol M the armature of the DC motor, symbol R a resistor connected in series with the DC motor circuit including the field winding F and the armature M, symbol K a contactor for short-circuiting the resistor R, symbol CH a chopper connected in parallel to the series circuit including the DC motor circuit and the resistor R, and symbol $D_s$ a diode for preventing the short-circuiting of a power supply when the chopper is ON and for returning the motor current $I_M$ to the power supply when the chopper is OFF. All of these component elements make up a main circuit of a well-known regenerative brake control system with a chopper.

In this main circuit, an end of the parallel circuit including the motor circuit and the resistor R and the chopper CH is connected to the anode of the diode $D_s$, while the other end thereof is connected to the earth. The cathode of the diode $D_s$ is connected to an end of the filter reactor $L_F$ and that of the filter capacitor $C_F$. The other end of the filter reactor $L_F$ is connected to a power line H through a pantagraph P. The other end of the filter capacitor $C_F$ is connected to the earth.

Symbol $CT_M$ shows a detector for motor current $I_M$, the output of which makes up the voltage $V_{IM}$ proportional to the motor current $I_M$. Symbol $E_M$ shows a motor voltage, symbol $V_M$ the motor voltage $E_M$ less the voltage drop across the resistor R ($= E_M - I_M R$), symbol $PT_M$ a detector for voltage $V_M$, the output of which assumes the voltage $V_M'$ proportional to the voltage $V_M$. Symbol $V_{cf}$ shows a filter capacitor voltage, and symbol $PT_s$ is a voltage $V_{cf}$ detector the output of which is adapted to make up the voltage $V_{cf}'$ proportional to an equivalent source voltage $V_{cf}(1 - \gamma_{min})$ taking into consideration the minimum duty cycle of the chopper in response to the detection of the voltage proportional to the filter capacitor voltage $V_{cf}$. Symbol AVR shows an automatic voltage regulator section. When the difference between the output voltage $V_{cf}$ of the detector $PT_s$ and the output voltage $V_M'$ of the detector $PT_M$ is reduced below the voltage $\Delta V_o$ in the beginning of the output of the voltage regulator section AVR, an output voltage $V_A$ is produced through a first order lag element $(1/1+T_v \cdot s)$ where $T_v$ is a time constant and S Laplace Operator. Symbol AMP shows a comparator-amplifier section of an automatic current regulator section ACR for comparing the $V_{IP}'$ produced from the current command value $V_{IP}$ through a first order lag element $(1/1+T_p \cdot S)$ with the voltage $V_{IM}$ proportional to the motor current $I_M$ and the output voltage $V_A$ of the voltage regulator section AVR and applying the error therebetween to the phase shifter APS through a first order lag element $(1/1+T_c \cdot S)$ where $K_c$ is a gain. The output of the phase shifter APS is applied to the gate of the chopper CH thereby to control the output of the automatic phase shifter APS, i.e., the duty cycle $\gamma$ of the chopper CH which is defined as $$\gamma = \frac{T_{ON}}{T_{ON} + T_{OFF}} = \frac{T_{ON}}{T}$$

where $T_{ON}$ is the ON period of the chopper, $T_{OFF}$ the OFF period thereof and T the chopper period. When the chopper CH is turned on, the armature current $I_M$ flows in a closed loop from the chopper CH, through resistor R, armature M, field winding F, smoothing reactor and back to the chopper CH. When the chopper CH is turned off, on the other hand, the current flows from the earth and through the resistor, armature M, field winding F, smoothing reactor MSL and the diode Ds, back to the power supply H via the pantagraph P. The output $V_A$ of the voltage regulator section AVR acts on the current regulator section ACR to reduce the current command value $V_{IP}$.

Figure 2:
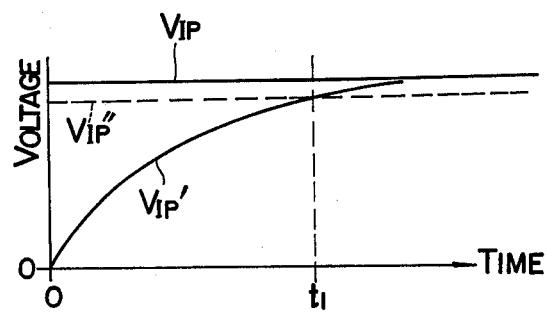
FIGS. 2 and 4 are characteristics diagrams of operating conditions showing the voltage variation representing current command values and the relation between motor voltage and revolutions, respectively.
Figure 3:
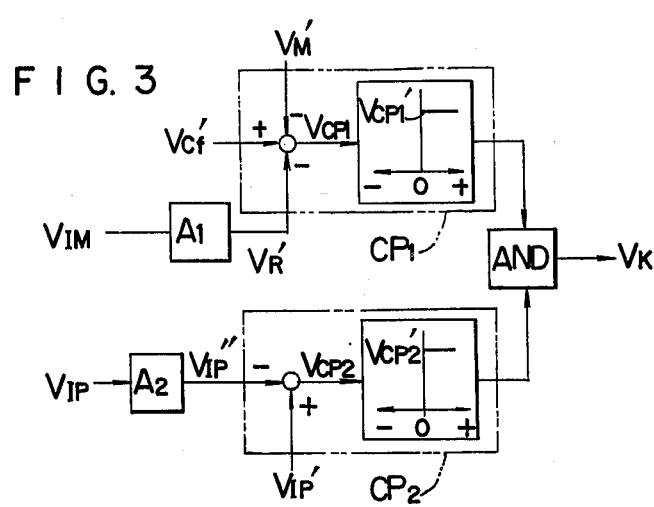
FIG. 3 is a diagram showing a circuit for generating a signal for short-circuiting the resistor shown in the circuit of FIG. 1.

Now, the resistor R shown in FIG. 1 is inserted in the high speed region where the motor voltage $E_M$ is higher than the equivalent source voltage $V_{cf}(1 - \gamma_{min})$. In the insertion state of the resistor R, the voltage regulator section AVR operates in such a manner that the motor voltage $E_M$ less the voltage drop $I_M R$ across the resistor R ($E_M - I_M R = V_M$) does not become higher than the equivalent source voltage $V_{cf}(1 - \gamma_{min})$. When the motor is reduced in speed to such a degree that the motor voltage $E_M$ is lower than the equivalent source voltage $V_{cf}(1 - \gamma_{min})$, the resistor R is short-circuited by the short-circuiting contactor K. In other words, when the condition $$V_M \leq V_{cf}(1 - \gamma_{min}) - I_M R \quad (1)$$

is met, the short-circuiting contactor K is thrown in. In the initial stage of regenerative braking, the current flowing in the field winding F is small and therefore the generated voltage $E_M$ is also low, so that the equation (1) is satisfied as soon as the starting of the regenerative braking. To control the contactor K, we have devised and tested a circuit as shown in FIG. 3 in which the short-circuiting signal $V_K$ is produced for the short-circuiting contactor K in response to the satisfaction of the equation (1) after the lapse of time $t_1$, for example, the time required for the current command value $V_{IP}'$ passed through the first lag element $(1/1+T_p \cdot s)$ to become substantially equal to the original current command $V_{IP}$, as shown in FIG. 2 for explaining operation. In the circuit of FIG. 3, the voltage $V_{cf}$ proportional to the equivalent source voltage $V_{cf}(1 - \gamma_{min})$, the voltage $V_M'$ proportional to the voltage $V_M$ representing the motor voltage $E_M$ less the voltage drop $I_M R$ across the resistor R, and the voltage $V_R'$ passed through the constant $A_1$ as voltage $V_{IM}$ and proportional to the voltage drop $I_M R$ across the resistor R, are applied to a first comparator $CP_1$. On the other hand, the voltage $V_{IP}''$ obtained by multiplying the current command value $V_{IP}$ by the constant $A_2$ and slightly smaller than the current command value $V_{IP}$, and the voltage $V_{IP}'$ obtained from the current command value $V_{IP}$ through the first order lag element $(1/1+T_p \cdot S)$, are applied to a second comparator $CP_2$. The comparators $CP_1$ and $CP_2$ operate in such a way that when the input voltages $V_{CP1}$ and $V_{CP2}$ are respectively negative, the output voltages thereof are "0," respectively, while the output voltages $V_{CP1}'$ and $V_{CP2}'$ are produced in response to positive input voltages $V_{CP1}$ and $V_{CP2}$ respectively. The AND gate AND produces a short-circuiting signal $V_K$ for short-circuiting the short-circuiting contactor K in response to both of the output voltages $V_{CP1}'$ and $V_{CP2}'$ of the comparators $CP_1$ and $CP_2$ respectively. In other words, the comparator $CP_2$ produces the output voltage $V_{CP2}$ and enters a stand-by state at time point $t_1$ as shown in FIG. 2. When the equation (1) is satisifed, the comparator $CP_1$ produces the output voltage $V_{CP1}$, with the result that the short-circuiting signal $V_K$ is produced through the AND gate AND thereby to throw in the short-circuiting contactor K. The circuit of FIG. 3 has proved to have the disadvantages mentioned below.

Figure 4:
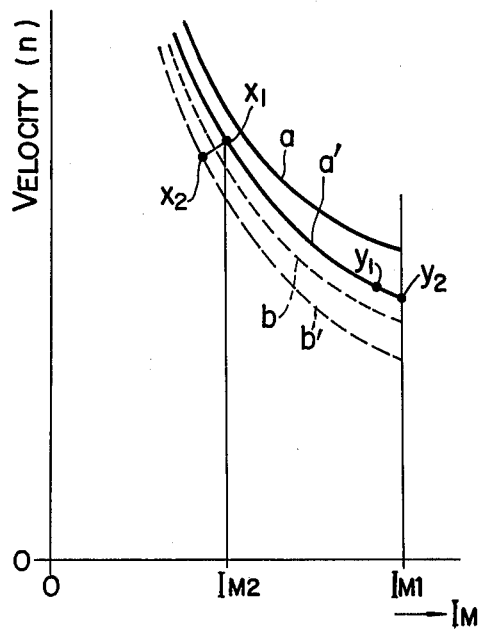

The diagram of FIG. 4 shows the characteristics of motor current $I_M$ as relative to the motor speed n when the output voltage $V_A$ is produced from the voltage regulator section AVR in high speed regions. The curve a shows critical characteristics where regenerative operation is possible at minimum duty cycle $\gamma_{min}$ of the chopper CH with resistor R inserted, while curve a' represents the static characteristics due to the operation of the voltage regulator section AVR. Further, curve b shows the critical characteristics where regenerative operation is possible at minimum duty cycle $\gamma_{min}$ of the chopper CH with resistor R short-circuited, and curve b' represents the static characteristics with the voltage regulator section AVR operated. Assume that regenerative braking operation is started at time point O in FIG. 2 and that the operating point of the regenerative brake is $x_1$ at time point $t_1$. At point $x_1$, the voltage $V_M$ representing the motor voltage $E_M$ of FIG. 1 less the voltage drop $I_M R$ across the resistor R is controlled below the equivalent source voltage $V_{cf}(1 - \gamma_{min})$. Under this condition, the motor current $I_M$ takes the form of $I_{M2}$ which is smaller than the current $I_{M1}$ equivalent to the current command value $V_{IP}$, and it has been found that the voltage drop $I_M R$ across the resistor R is so small as to cause the possibility of satisfying the equation (1). For instance, assume that $V_{cf} = 1500$ V, $I_{M2} = 300$ A, $\gamma_{min} = 0.05$, R = 0.2 Ω, $V_M = 1350$ V and the operation start voltage of the voltage regulator section AVR is $\Delta V_o = 75$ V. The left side of equation (1) is 1350 V, while the right side thereof is 1365 V, satisfying equation (1). Since the time point $t_1$ in FIG. 2 has already passed and the output voltage $V_{CP2}'$ is produced from the comparator $CP_2$ of FIG. 3, the satisfaction of equation (1) at point $x_1$ in FIG. 4 causes the comparator $CP_1$ in FIG. 3 to produce the output voltage $V_{CP1}'$, so that the AND gate AND produces the short-circuiting signal $V_K$ thereby to throw in the short-circuiting contactor K for short-circuiting the resistor R. When the resistor R is short-circuited at point $x_1$ in FIG. 4 in this way, the operating point shifts to point $x_2$ on the static characteristics curve $b'$ associated with the short-circuiting of the resistor R. Thus the subsequent regenerative braking control is effected on the characteristics curve $b'$. The result is the shortage of regenerative brake power and a reduced regenerative power, thus greatly reducing the effect due to the insertion of the resistor R.

This invention relates to an improved regenerative brake control circuit for DC motor due to a chopper which obviates the disadvantages of the above-mentioned control circuits.

Figure 5:
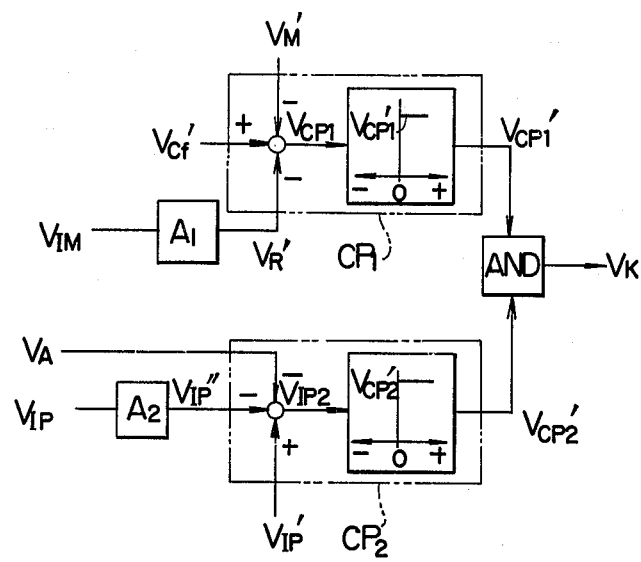
FIG. 5 is a circuit diagram showing a first embodiment of the present invention.

A few embodiments of the invention will be described below with reference to the accompanying drawings of FIG. 5 and subsequent diagrams. In FIG. 5 of a first embodiment, the comparator $CP_1$ is for producing an output voltage $V_{CP1}'$ in response to a positive state of the voltage $V_{CP1}$, which is the output voltage $Vcf$ of the detector PTs proportional to the equivalent source voltage $Vcf(1 - \gamma_{min})$, less the output voltage $V_M'$ proportional to the voltage $V_M$ (which is the motor voltage $E_M$ less the voltage drop $I_M R$ across the resistor R) and the output voltage $V_R'$ proportional to the voltage drop $I_M R$ of the resistor R (which is obtained by multiplying the output voltage ($V_{IM}$ of the detector $CT_M$ proportional to the motor current $I_M$ by constant $A_1$). This indicates that when the equation (1) is satisfied, the comparator $CP_1$ produces the output $V_{CP1}'$. The comparator $CP_2$, on the other hand, produces the output voltage $V_{CP2}'$ in response to a positive state of the voltage $V_{CP2}$ which is the voltage $V_{IP}'$ obtained from the current command value $V_{IP}$ through the first order lag element $(1/1+Tp\cdot S)$, less the sum of the output voltage $V_A$ of the voltage regulator section AVR and the voltage $V_{IP}''$ slightly smaller than the current command value $V_{IP}$, the voltage $V_{IP}''$ being obtained by multiplying the current command value $V_{IP}$ by the constant $A_2$. In other words, the output voltage $V_{CP2}'$ begins to be produced at the time point $t_2$ in FIG. 6. Further, the AND gate AND applies the signal $V_K$ to the short-circuiting contactor K in parallel to the resistor in FIG. 1 to short-circuit the resistor R when the comparators $CP_1$ and $CP_2$ produce the output voltages $V_{CP1}'$ and $V_{CP2}'$ respectively.

Figure 6:
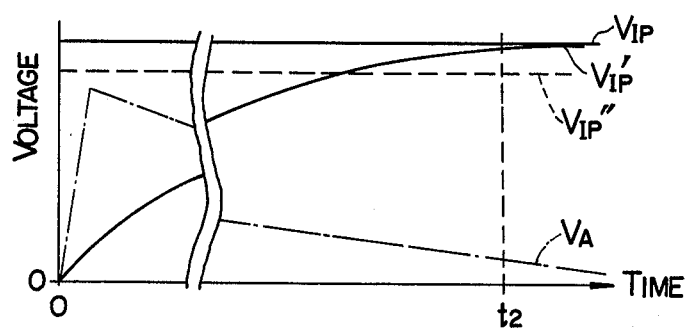
FIG. 6 is a characteristics diagram showing the operating conditions similar to those in FIG. 2.

According to the first embodiment shown in FIG. 5, the output voltage $V_{CP}'$ is produced by the comparator $CP_1$ in response to the satisfaction of equation (1) at point $x_1$ on the characteristics curve $a'$ with resistor R in the current and motor speed characteristics diagram of FIG. 4. Since the output voltage $V_A$ of the voltage regulator section AVR is so large at point $x_1$ that the time point $t_2$ in FIG. 6 is not reached. Therefore, the input voltage $V_{CP2}$ of the comparator $CP_2$ is negative, with the result that the comparator $CP_2$ fails to produce an output. The resulting failure of the AND gate AND to produce the short-circuiting signal $V_K$ for the resistor R prevents the resistor R from being short-circuited. The regenerative brake operation on the characteristics curve $a'$ with the resistor R inserted as shown in FIG. 4 is thus continued.

With the decrease in motor speed, the output voltage $V_A$ of the voltage regulator section AVR is reduced, so that the input voltage $V_{CP2}$ of the comparator $CP_2$ becomes positive and the comparator $CP_2$ produces the output voltage $V_{CP2}'$ at time point $t_2$. Under this condition, the operating point of the regenerative brake is at $y_1$ on the characteristics curve $a'$ of FIG. 4 and the motor current $I_M$ approximates the current $I_{M1}$ equivalent to the current command value $V_{IP}$. As a result, the voltage drop $I_{M1}R$ across the resistor R in equation (1) is so large that the equation (1) fails to be satisfied. The input voltage of the comparator $CP_1$ is therefore negative, preventing any output from being produced from the comparator $CP_1$, so that no short-circuiting signal $V_K$ for resistor R is produced from the AND gate AND. Consequently, the operating point of the regenerative brake shifts from point $y_1$ to point $y_2$ on the characteristics curve $a'$ in FIG. 4. When the operating point is thus shifted to $y_2$, the output voltage of the voltage regulator section AVR is reduced to zero and moves out of the voltage control region, thus controlling the motor current $I_M$ at a level equivalent to the current command value $V_{IP}$. The resistor R is short-circuited when the equation (1) is satisfied in a predetermined control region of the motor current $I_M$.

According to the embodiment under consideration, the resistor R fails to be short-circuited in the voltage control region where the voltage $V_M$ (which is the motor voltage $E_M$ less the voltage drop $I_M R$ across the resistor R in FIG. 1) is controlled below the equivalent source voltage $Vcf(1 - \gamma_{min})$, i.e., as long as the voltage regulator section AVR produces the output voltage $V_A$, thus making possible an effective regenerative brake control without any shortage of regenerative brake power or without reducing regenerative power.

A second embodiment of the invention is shown in FIG. 7, where like component elements are denoted by like reference symbols in FIG. 5. The embodiment of FIG. 7 is different from that of FIG. 5 in that, in the embodiment of FIG. 7, the output voltage $V_{CP2}'$ is produced by the comparator $CP_2$ in response to a positive state of $V_{IP}'$ representing the current command value $V_{IP}$ passed through the first order lag element $(1/1+Tp\cdot S)$, less the voltage $V_{IP}''$ representing the current command value $V_{IP}$ applied through the constant $A_2$, the voltage $V_{IP}''$ being lower than the current command value $V_{IP}$. Further, the output side of the comparator $CP_2$ is connected with a gate circuit NAND for producing an output voltage $V_N$ when the output voltage $V_A$ of the voltage regulator section AVR is zero. In other words, it is not until the comparator $CP_1$ produces the output voltage $V_{CP1}'$ and the gate circuit NAND produces the output voltage $V_N$ that the AND gate AND produces the short-circuiting signal $V_K$ for resistor R. In this way, the short-circuiting signal $V_K$ for resistor R is absent in the voltage control region as long as the output voltage $V_A$ is produced from the voltage regulator section AVR, leading to the same advantage as that of the circuit in FIG. 5. The gate circuit NAND may alternatively be disposed at the output side of the comparator $CP_1$.

A third embodiment of the present invention is shown in FIG. 8, where like reference symbols denote like component elements in FIGS. 5 and 7. The third embodiment is different from the embodiment of FIG. 7 in that, in the third embodiment, the comparator $CP_2$ in FIG. 7 is replaced by time delay means $Ry$ with a constant voltage $Vcc$ applied thereto. If the time delay means $Ry$ is set at time $t_1$ in FIG. 2, an effect similar to that of FIGS. 5 and 7 is achieved.

Figure 9:
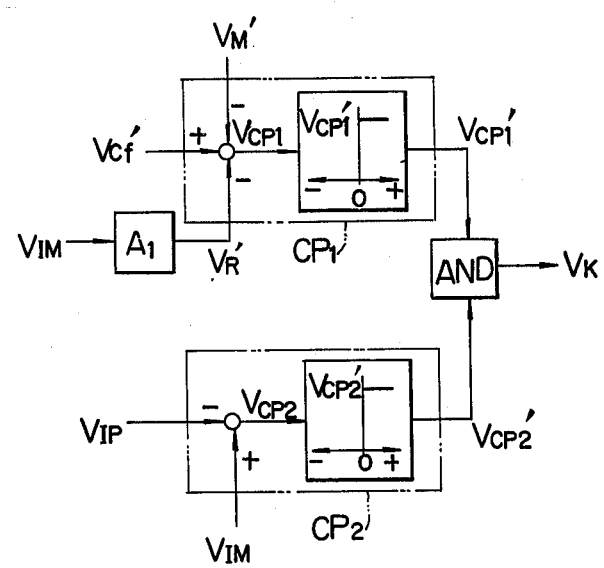

A fourth embodiment of the invention is shown in FIG. 9, in which like component elements are shown by like reference symbols as in FIG. 5. The fourth embodiment is different from the embodiment of FIG. 5 in that, in the fourth embodiment, the comparator $CP_2$ produces the output voltage $V_{CP2}'$ when the voltage $V_{IM}$ proportional to the motor current $I_M$ becomes substantially equal to the current command value $V_{IP}$. In the voltage control region of the motor, the motor current $I_M$ is smaller than the current equivalent to the current command value $V_{IP}$ and therefore the output voltage $V_{CP2}'$ fails to be produced from the comparator $CP_2$. As a result, the resistor R fails to be short-circuited in the voltage control region, resulting in the same advantage as the circuit of FIG. 5.

It will be thus understood that according to the present invention, the resistor R is prevented from being short-circuited in the voltage control region where the voltage $V_M$ representing the motor voltage $E_M$ less the voltage drop $I_M R$ across the resistor R is controlled below the equivalent source voltage $Vcf(1 - \gamma_{min})$, thus enabling a superior regenerative braking control.

We claim:

1. A regenerative brake control system for a DC motor, comprising a DC motor; resistor means connected in series to said DC motor; switch means for short-circuiting said resistor means; chopper means connected in parallel to a series circuit including said DC motor and said resistor means for controlling the armature current of said DC motor by on-off operation of said chopper means; means for regulating the duty cycle of said chopper means; a filter circuit being connected through a diode to a parallel circuit including said chopper means and said series circuit; and a power supply connected to said filter circuit; said short-circuiting switch means failing to operate within a predetermined range of the difference between an equivalent source voltage taking into consideration the minimum duty cycle of said chopper and the motor voltage less the voltage drop across the resistor.

2. A regenerative brake control system according to claim 1, in which said duty cycle control means include automatic current regulator means for causing said motor current to follow the current command value, and automatic voltage regulator means for regulating the voltage not to exceed the equivalent source voltage, said voltage being equal to the motor voltage less the voltage drop across the resistor means, said voltage regulator means acting on said current regulator means to reduce the current command value, said short-circuiting switch means failing to operate in the voltage control region of said voltage regulator means.

3. A regenerative brake control system according to claim 2, further comprising a first comparator for producing an output signal in response to a substantially positive state of the voltage equivalent to the voltage proportional to said equivalent source voltage, less the voltage and the voltage, said voltage being proportional to the voltage which is the motor voltage less the voltage drop across said resistor means, said voltage being proportional to the voltage drop across said resistor means; and a second comparator for producing an output signal in response to a substantially positive state of the voltage equivalent to the voltage obtained by passing the current command value through a first order lag element, less the output voltage of said voltage regulator section and the voltage slightly lower than said current command value, said switch means being operated for short-circuiting said resistor means in response to the output signals of said first and second comparators respectively.

4. A regenerative brake control system according to claim 2, further comprising a first comparator for producing an output signal in response to a substantially positive state of the voltage equivalent to the voltage proportional to said equivalent source voltage, less the voltage and the voltage, said voltage being proportional to the voltage which is the motor voltage less the voltage drop across said resistor means, said voltage being proportional to the voltage drop across said resistor means; a second comparator for producing an output signal in response to a substantially positive state of the voltage equivalent to the voltage obtained by passing the current command value through a first order lag element, less the voltage slightly lower than said current command value; and a NAND gate connected at the output side of said second comparator, said NAND gate producing an output voltage when the output voltage of said voltage regulator section is reduced substantially to zero, said switch means being operated for short-circuiting said resistor means in response to the output voltage and said output voltage.

5. A regenerative brake control system according to claim 2, further comprising a first comparator for producing an output signal in response to a substantially positive state of the voltage equivalent to the voltage proportional to said equivalent source voltage, less the voltage and the voltage, said voltage being proportional to the voltage which is the motor voltage less the voltage drop across said resistor means, said voltage being proportional to the voltage drop across said resistor means; a second comparator for producing an output signal in response to a substantially positive state of the voltage equivalent to the voltage obtained by passing the current command value through a first order lag element, less the voltage slightly lower than said current command value; and a NAND gate connected at the output side of said first comparator, said NAND gate producing an output signal when the output voltage of said voltage regulator section is reduced substantially to zero, said switch means being operated for short-circuiting said resistor means in response to the output voltage and the output voltage of said second comparator.

6. A regenerative brake control system according to claim 2, further comprising a first comparator for producing an output signal in response to a substantially positive state of the voltage equivalent to the voltage proportional to said equivalent source voltage, less the voltage and the voltage, said voltage being proportional to the voltage which is the motor voltage less the voltage drop across said resistor means, said voltage being proportional to the voltage drop across said resistor means; and a NAND gate impressed with the output signal of time delay means and the output voltage of said voltage regulator section, said time delay means being impressed with a constant voltage, said NAND gate producing an output signal when said output signal is reduced substantially to zero; said switch means being operated for short-circuiting said resistor means in response to said output signals and said signal.

7. A regenerative brake control system according to claim 2, further comprising a first comparator for producing the output signal in response to a substantially positive state of the voltage equivalent to the voltage proportional to said equivalent source voltage, less the voltage and the voltage, said voltage being proportional to the voltage which is the motor voltage less the voltage drop across said resistor means, said voltage being proportional to the voltage drop across said resistor means; and a second comparator for producing the output voltage when said voltage proportional to the motor current becomes substantially equal to said current command value, said switch means being operated for short-circuiting said resistor means in response to said signal and said signal.

* * * * *